United States Patent [19]

Dunning

[11] 4,090,647
[45] May 23, 1978

[54] APPLICATOR CONTAINER

[76] Inventor: Belford O. Dunning, 1983 Gordon Rd., #7, Atlanta, Ga. 30310

[21] Appl. No.: 707,176

[22] Filed: Jul. 21, 1976

[51] Int. Cl.² .............................................. B67D 5/06
[52] U.S. Cl. ................................... 222/543; 222/562; 401/263
[58] Field of Search ............... 222/562, 563, 543, 546, 222/206; 401/136, 263, 183

[56] References Cited

U.S. PATENT DOCUMENTS

| 1,506,413 | 8/1924 | Darlington | 222/563 |
| 1,593,025 | 7/1926 | MacDonald | 401/263 |
| 2,921,716 | 1/1960 | Schiller | 222/563 X |
| 3,227,332 | 1/1966 | Gowdy et al. | 222/563 X |
| 3,282,478 | 11/1966 | Russell | 222/546 X |
| 3,667,656 | 6/1972 | DePutron | 222/562 X |
| 3,930,599 | 1/1976 | Brothers | 222/546 X |
| 4,002,275 | 1/1977 | Crowle | 222/543 |

FOREIGN PATENT DOCUMENTS 1,111,994  3/1956  Germany ............... 401/183

Primary Examiner—Joseph F. Peters, Jr.
Assistant Examiner—Norman L. Stack, Jr.
Attorney, Agent, or Firm—John J. Byrne; Edward E. Dyson

[57] ABSTRACT

A squeeze bottle container with a threaded neck receiving a cap formed with a tapered spout with a relatively small discharge opening through the spout terminating in the center of an angular surface for applying a fluid. A closure cap for sealing the outlet is secured to the spout by a flexible strap and is provided with a tongue received within the dispensing outlet to enhance the seal.

1 Claim, 2 Drawing Figures

APPLICATOR CONTAINER

This invention relates to a container and a novel cap therefor and in particular relates to containers of the plastic, squeeze-dispensing type for applying substances having a paste-like or creamy consistency.

In one particular environment of use of the combination described herein, the substance to be applied is a chemical hair straightening cream of a known type. Such a substance, even under most favorable conditions, can irritate the scalp when improperly applied and, in some instances, can produce severe burning and disfigurement if in contact with unprotected skin for an appreciable length of time. Therefore, one principal objective of this invention is to provide a container which enables a beauty operator to apply such a cream with a speed, accuracy and tidiness heretofore unattainable by devices of the prior art.

It is a principal objective of this invention to provide a dispensing outlet having a generally pointed shape, somewhat like the end of a tooth of a comb, whereby accurate, quick and even hair parting is accomplished during application.

Another important objective of the invention is to provide a dispensing orifice for causing an elongated ribbon-like quantity of the substance to be dispensed at an outlet having the characteristics of a spreader.

A further objective of the invention is to provide a dispensing container of the type described which substantially reduces the time necessary for an operator to treat a particular amount of hair.

A still further objective of the invention is to provide a dispensing cap and container combination wherein means are utilized to prevent leakage from any place other than at the dispensing orifice.

A still further objective of the invention is to provide a container having a shape and design which is conveniently handled by an operator for accurate distribution of the hair straightening substance.

Another important objective of the invention is to provide a flexible container having a smaller bottom gradually tapering to a larger upper section which aids in minimizing the size of the air pocket formed when releasing the substance through a squeezing action. This design consideration aids free flowing of the substance and provides a longer life for the bottle due to a minimizing of the squeeze necessary to cause the ribbon of substance to be extruded.

These and other objectives of this invention will become more clearly apparent upon a reading of the following description taken in view of the attached drawings in which.

Figure 1:
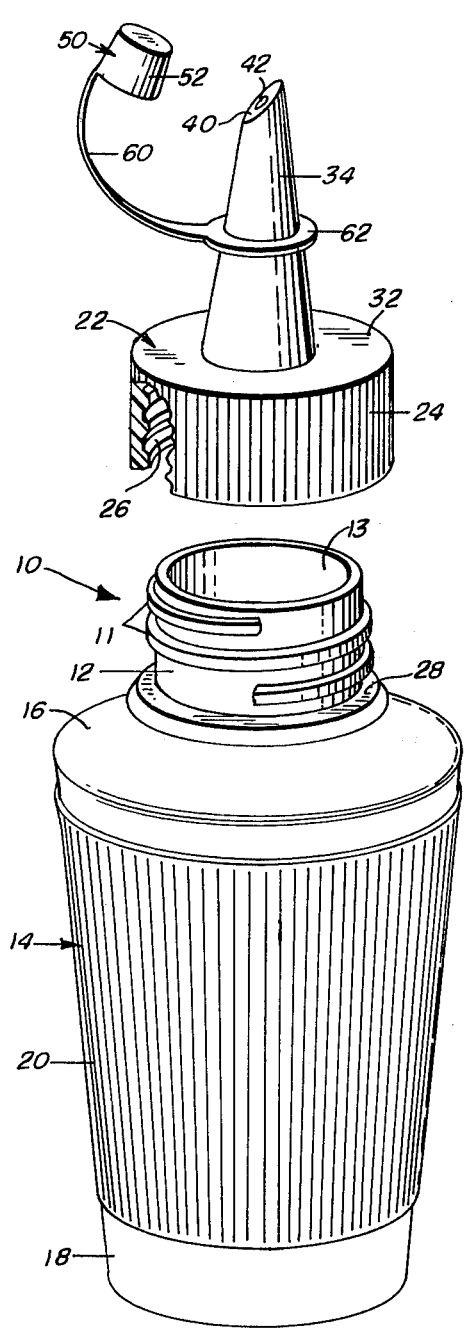
FIG. 1 is an exploded perspective view of the cap and bottle combination.
Figure 2:
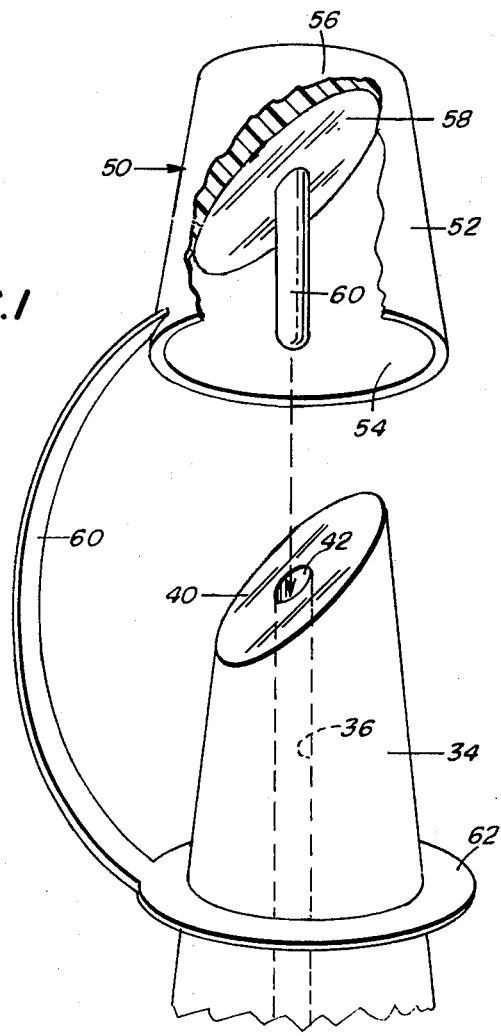
FIG. 2 is an enlarged, exploded perspective view of the dispensing portion of the applicator with portions broken away.

Referring now more particularly to the drawings wherein like numerals indicate like parts, the numeral 10 indicates a plastic container of a flexible substance having chemical characteristics not affected by a hair straightening substance. Plastics of the polystyrene type are suitable for these purposes. Extending upwardly from the upper portion of the container is a threaded cylindrical neck portion 12 having an enlarged mouth 13 therethrough. The container body 14 is circular in cross-section and has an upper portion 16 having a larger cross-sectional diameter than the bottom portion 18. The upper and bottom portion are joined by a generally inwardly and downwardly tapered side wall 20. The side wall is etched or roughened to provide a convenient gripping surface for an operator.

Adapted to enclose the threaded neck 12 is a cap 22 having a knurled skirt portion 24 threaded at 26 to mate with the threads 11 of the neck portion 12. At the base of the mouth portion 13 there is formed a shoulder 28 which provides an annular sealing area with the bottom 30 of the skirt 24 when the threads are in full engagement with one another.

The upper end of the skirt 24 is terminated by a top 32. Extending upwardly from the top is a conical dispensing nozzle 34 having a recess 36 extending throughout its longitudinal length. The nozzle is terminated at its upper end by a planar surface 40 which is approximately 45° to the longitudinal axis of the spout. necessary because even under the most favorable conditions, the scalp can be injured if the chemical substance comes in direct contact therewith. Because of this, it is extremely important that the chemical substance be applied, spread and removed with maximum efficiency. With the device described, the straightener cream is applied in small, ribbon-like strips having an oval shape in cross-section. In combination with this, the dispensing orifice is surrounded by a slanted flat surface as a spreading instrument. By holding the dispensing orifice the proper distance from the hair, the substance is dispensed and spread with one movement. This is the technique mastered by a skilled beautician in a matter of minutes. Another reason efficient spreading is necessitated is that a high degree of control must be utilized in applying the substance as various areas of the head are treated. An overlapping of the straightening substance is very undesirable causing immediate hair breakage at the overlap in many instances.

Another feature of the container described is that although the dispensing orifice is comparatively small, the wide mouth of the container proper permits the operator to insert a standard tablespoon for filling the bottle with the hair straightener cream.

Since the chemical substance is an irritant, another advantage of the combination is that the threaded cap having an end abutting a smooth shoulder at the base of the threaded neck provides a very formidable seal. When not in use, this seal is further aided by the stopper 50 having its stopper tongue 60 inserted into the dispensing orifice.

In a general manner, while there has been disclosed an effective and efficient embodiment of the invention, it should be well understood that the invention is not limited to such embodiment, as there might be changes made in the arrangement, disposition, and form of the parts without departing from the principle of the present invention as comprehended within the scope of the accompanying claims.

I claim:

1. A plastic squeeze dispensing container for a chemical hair straightener comprising a body for receiving said hair straightener, a threaded neck at the upper end of said body having an enlarged mouth therethrough, a smooth annular shoulder defined between said neck and said body, a cap having an interiorly threaded cylindrical skirt engageable with the threads of said neck and a lower edge in sealing engagement with said shoulder, a top terminating one end of said skirt, an elongated spout extending outwardly from said top and having a conical outer surface and a central interior recess throughout the length thereof in communication with said mouth, said spout terminated at its outer end by a planar spreading surface angularly disposed at approximately 45° with the longitudinal axis of said spout, the terminal outlet of said interior recess being located at the axial center of said planar spreading surface, wherein it forms an oval dispensing outlet, and a second cap having a closed end, a skirt portion having interior sides in frictional engagement with the conical outer surface of said spout, a tongue which projects into and seals said interior recess, and an inner surface which mates with said planar spreading surface, said planar spreading surface having a surface area substantially greater than the cross-sectional area of said oval dispensing outlet.

* * * * *